US009060340B2

(12) United States Patent  (10) Patent No.: US 9,060,340 B2
Chen  (45) Date of Patent: Jun. 16, 2015

(54) RE-CONFIGURABLE COMMUNICATION DEVICE AND MANAGING METHOD THEREOF

(75) Inventor: Kwang-Cheng Chen, Taipei (TW)

(73) Assignee: MSTAR SEMICONDUCTOR, INC., Chu Pai Hsinchu Hsien (TW)

( * ) Notice: Subject to any disclaimer, the term of this patent is extended or adjusted under 35 U.S.C. 154(b) by 685 days.

(21) Appl. No.: 13/459,741

(22) Filed: Apr. 30, 2012

(65) Prior Publication Data

US 2012/0213120 A1  Aug. 23, 2012

Related U.S. Application Data

(62) Division of application No. 12/107,509, filed on Apr. 22, 2008, now abandoned.

(60) Provisional application No. 60/913,298, filed on Apr. 23, 2007.

(51) Int. Cl.
*H04L 12/26* (2006.01)
*H04W 52/24* (2009.01)
*H04W 28/18* (2009.01)
*H04W 88/02* (2009.01)

(52) U.S. Cl.
CPC ............ *H04W 52/245* (2013.01); *H04W 28/18* (2013.01); *H04W 88/02* (2013.01)

(58) Field of Classification Search
CPC ..... H04L 47/14; H04W 52/245; H04W 28/18
USPC ......................................... 370/252, 329, 254
See application file for complete search history.

(56) References Cited

U.S. PATENT DOCUMENTS

2005/0068965 A1  3/2005  Lin et al.
2006/0045117 A1*  3/2006  Qi et al. ........................ 370/252
2007/0206634 A1  9/2007  Lotter et al.

FOREIGN PATENT DOCUMENTS

CN  1593050 A  3/2005
CN  1731693 A  2/2006

OTHER PUBLICATIONS

"IEEE Standard for Information technology—Telecommunications and information exchange between systems—Local and metropolitan area networks—Specific Requirements, Part 11: Wireless LAN Medium Access Control (MAC) and Physical Layer (PHY) Specifications," IEEE Computer Society. IEEE Std. 802.11™—2007, New York, NY, Jun. 12, 2007.
Mitola III, Joseph, "Cognitive Radio Architecture: The Engineering Foundations of Radio XML, " Chapter 5—Cognitive Radio Architecture, pp. 123-153, 2006, John Wiley & Sons, Inc.
Mitola III, Joseph, "Cognitive Radio: An Integrated Agent Architecture for Software Defined Radio," Dissertation, Doctor of Technology, Royal Institute of Technology (KTH), Kista, Sweden, May 8, 2000.

* cited by examiner

*Primary Examiner* — Steven H Nguyen
(74) *Attorney, Agent, or Firm* — Rabin & Berdo, P.C.

(57) ABSTRACT

A communication apparatus including a physical information recognizing module, an MAC information recognizing module, a coordinating module, and a re-configurable transmitting/receiving module is provided. The physical information recognizing module recognizes a set of physical information relative to at least one communication network. The MAC information recognizing module recognizes a set of MAC information relative to the at least one communication network. The coordinating module generates a set of control signals selectively based on the set of physical information and the set of MAC information. The re-configurable transmitting/receiving module is configured according to the set of control signals and is used for transmitting/receiving data via the at least one communication network.

16 Claims, 9 Drawing Sheets

FIG. 8

| | ALOHA w/ Geometry or binary Exponential backoff | Basic Q-ary CRA | p-persistent CSMA | CSMA/CA | GRAP |
|---|---|---|---|---|---|
| Slot Time | One transmission + one feedback | One transmission + one feedback | One propagation delay | Defined in spec. | One propagation delay |
| Access Method | Free | Free | Free | Free | Blocked |
| Completeness | No | No | No | No | Yes |
| Memoryless after lost | No | Yes | No | Yes | No |
| Report grouping result | No | No | No | No | Yes |
| Group process scheme | Two way handshaking | Two way handshaking | Two way handshaking | Four way handshaking | Polling |
| Type of CATE | None | None | Geometric.CATE | BEB.CATE | Uniform.CATE |
| Type of CRTE | Geometric.CRTE or BEB.CRTE | Q-ary CRA.CRTE | Geometric.CRTE | BEB.CRTE | Uniform.CRTE |

RE-CONFIGURABLE COMMUNICATION DEVICE AND MANAGING METHOD THEREOF

The application is a divisional application of application Ser. No. 12/107,509 filed on Apr. 22, 2008, which claims the benefit of U.S. Provisional Application No. 60/913,298, filed on Apr. 23, 2007, for which priority is claimed under 35 USC §120, the entire contents of which are hereby incorporated by reference.

BACKGROUND OF THE INVENTION

1. Field of the Invention

The present invention is related to mobile equipment with re-configurable transceiver and, in particular, to cognitive radio.

2. Description of the Prior Art

From mid-1980's, many researchers have hoped to realize a universal wireless communication system with 3 G communication techniques. However, in the past years, the universal wireless communication system is not realized. Further, to conform to different requirements (such as different data rates and different propagation distances) of actual applications, various new wireless communication standards have also been widely deployed in addition to 3G systems. Among so many wireless communication standards, some standards may co-exist in the same region or utilize the same frequency band. For instance, both Bluetooth and WiFi transmit data via the 2.4 GHz ISM band.

Although there are diverse standards, regulatory institutions in several countries found that most of the radio frequency spectrum was inefficiently utilized. For example, cellular network bands are overloaded in most parts of the world, but amateur radio and paging frequencies are not. To increase the overall utility of the radio frequency bands, mobile devices capable of operating conforming to multiple standards and in multiple bands are desired.

Unlicensed mobile access (UMA) is a telecommunication system allowing seamless roaming between local area networks and wide area networks using a dual-mode mobile phone. The local network may be provided based on private unlicensed spectrum technologies like Bluetooth or 802.11, while the wide network is alternatively GSM/GPRS or UMTS mobile services. This standard firstly introduces an international effort to allow multiple-standard multiple-band systems into realistic and ubiquitous wireless applications.

Software-defined radio (SDR) is considered as a means to facilitate the UMA concept. The basic idea of SDR is to adjust system parameters of a processor-based platform (usually facilitated by digital signal processors to execute physical layer transmitting/receiving functions), so that one platform can serve multiple system specifications.

Cognitive radio is an extended concept of SDR. More specifically, a cognitive radio is capable of sensing the communication environment (e.g. spectrum utility) so that the mobile device can self-organize appropriate communication and networking functions via re-configurable communication/network processors. With the potential of fully utilizing spectrum efficiency, cognitive radio has been considered as one key technology for future wireless communication and ubiquitous networking.

Up to this moment, most cognitive radio literatures deal with the conceptual design, tools, fundamental limits, or extremely complicated realization for military applications. Moreover, most of the research work is currently focusing on spectrum sensing cognitive radio, particularly in the TV bands. Under the concept of cognitive radio, unlicensed users are allowed to utilize licensed bands whenever it would not cause any interference (by avoiding them whenever legitimate user is sensed). The spectrum sensing cognitive radio first detects the unused spectrum, and then captures the best available spectrum to meet user communication requirements. For spectrum sensing cognitive radio, maintaining seamless communication and determining a fair spectrum schedule are both important issues.

Although spectrum sensing cognitive radio has provided considerable improvements in spectrum utility compared with prior arts, the full cognitive radio taking more communication parameters into account is still an essential development for future wireless communication. Therefore, in this invention, we would like to propose a complete architecture of terminal devices to realize cognitive radio that fits future commercial application scenarios and general convergence of Internet applications.

SUMMARY OF THE INVENTION

According to this invention, the concept of cognitive radio is generalized toward a complete networking environment sensing and the leverage of co-existing systems/networks. In addition to spectrum efficiency, the overall networking efficiency for mobile devices in front of co-existing networks is considered and enhanced. Self-organized cognitive radio architectures for terminal devices to fully utilize spectrum and co-existing systems/networks are also proposed.

One embodiment according to the invention is a communication device including a physical information recognizing module, an MAC information recognizing module, a coordinating module, and a re-configurable transmitting/receiving module. The physical information recognizing module is used for recognizing a set of physical information relative to at least one communication network adjacent to the communication device. The MAC information recognizing module is used for recognizing a set of MAC information relative to the at least one communication network. Based on the set of physical information and the set of MAC information, the coordinating module generates a set of control signals. The re-configurable transmitting/receiving module is configured according to the set of control signals and used for transmitting/receiving data via the at least one communication network.

In actual applications, the set of physical information and the set of MAC information can respectively include one or more possible and observable parameters relative to the at least one communication network. For instance, the set of physical information can include the carrier frequency, band utility rate, received signal strength indication (RSSI), or signal-to-interference and noise ratio (SINR) of RF signals received from the at least one communication network. The set of physical information can also include the symbol rate, carrier/timing characteristic, pilot signal, channel fading characteristic, modulation parameter, forward error correction (FEC) type/rate, multiple-input multiple-output (MIMO) parameter, or power control characteristic associated with digital baseband signals converted from the RF signals.

On the other side, the set of MAC information can include parameters derived from the digital baseband signals, such as multiple access protocol associated with the RF signals, radio resource allocation of the at least one communication network, automatic repeat request (ARQ) pattern of the digital baseband signals, routing/mobility characteristic associated with the at least one communication network, etc.

Based on the physical and MAC information, the communication device, according to the invention, can be configured to adapt to and efficiently utilize co-existing systems/networks. The advantage and spirit of the invention may be understood by the following recitations together with the appended drawings.

BRIEF DESCRIPTION OF THE APPENDED DRAWINGS

FIG. 8 summarizes some common cases and corresponding operating parameters of the MAC algorithm.

Figure 9:
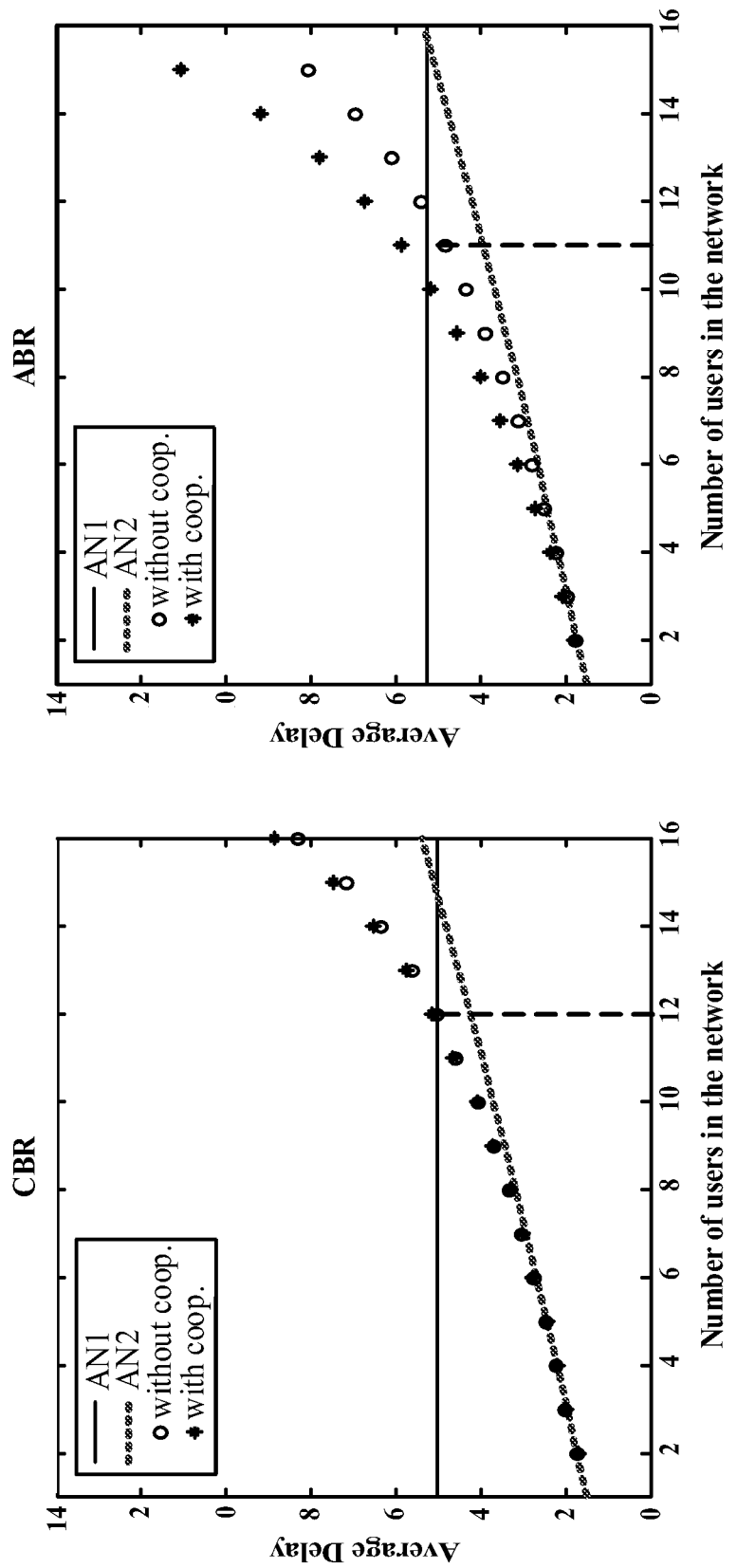

FIG. 9 shows the average delay for CBR and ABR service.

DETAILED DESCRIPTION OF THE INVENTION

Since establishing a universal wireless communication system governing all kinds of applications requires tremendous and revolutionary efforts in establishing infrastructure and replacement of billions mobile terminals, an intelligent terminal device that can identify the condition of surrounding communication environments (e.g. available spectrum, available infrastructure and/or systems at licensed/unlicensed bands) and can adopt communication that meets a good service quality (e.g. less delay, jitter, cost, etc.) is desirable for future wireless communication.

From this point of view, the entire communication/networking in the invention is considered as multiple-standard systems co-existing in time, frequency, and spatial (geographical location or distance) domains. It is a generalization from traditional cognitive radio definition that the secondary system is allowed by leveraging idle radio resources (in time and/or frequency domain) of the primary user system. In other words, the spectrum-efficient cognitive radio is extended into the network-efficient self-organized cognitive radio.

Rate-Distance Feature of Wireless Communication

Before explaining the re-configurable architecture of mobile devices according to the invention, some observations relative to the rate-distance nature of wireless communication are first introduced below.

Assuming that a primary communication system is functioning, a cognitive radio (i.e. the secondary user) can explore the channel status and seek for possibility to utilize the spectrum for communication. Generally, the channel can be modeled as an Elliot-Gilbert channel with two possible states: existence of the primary user (a state not allowing the secondary user to transmit data), and non-existence of the primary user (a state allowing the secondary user to transmit data).

Figure 1:
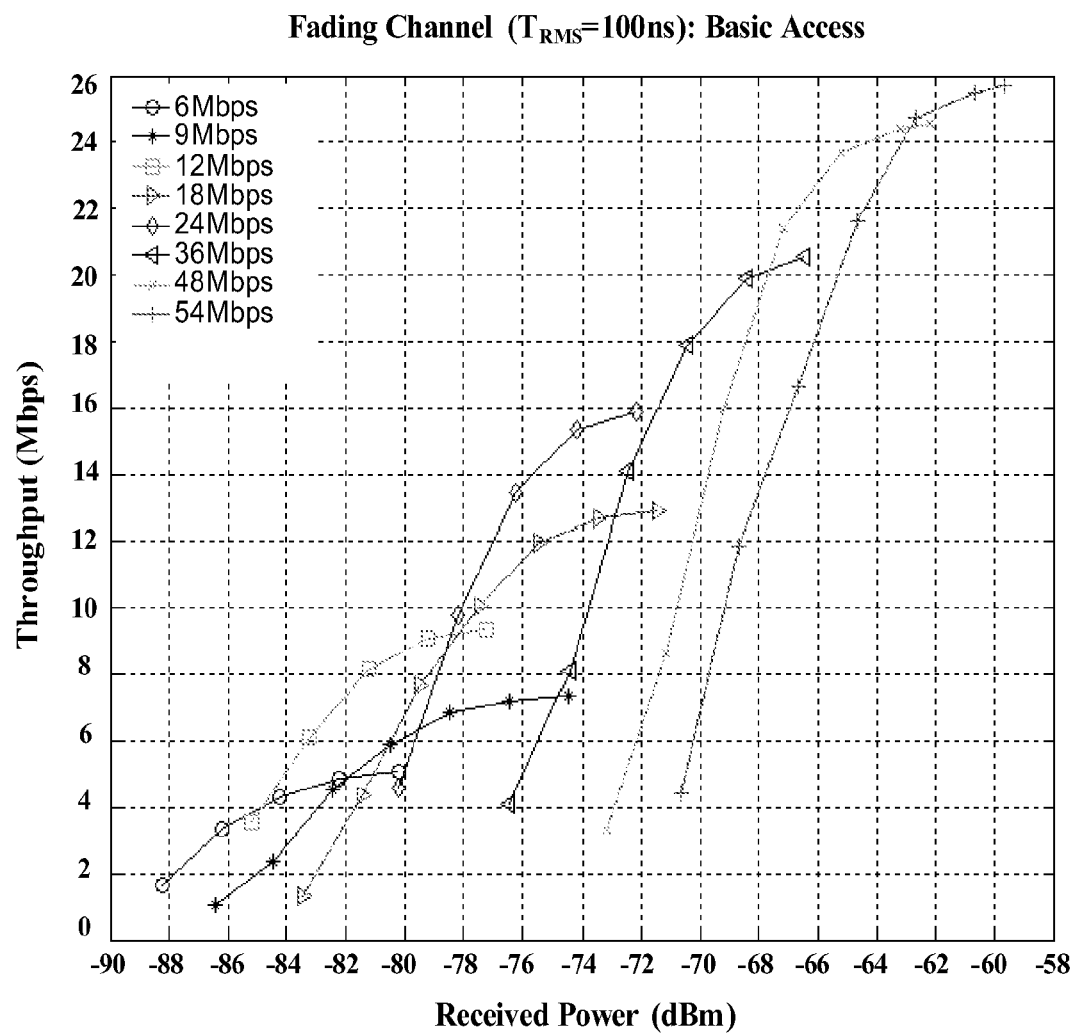
FIG. 1 shows a set of operating curves of IEEE 802.11g communication.

An important and fundamental feature of wireless communication systems is the rate-distance relationship, which has not drawn much attention in communication theory but is critical in state-of-the-art wireless communication systems. An observation on a realistic IEEE 802.11a/g OFDM PHY and MAC has been disclosed in IEEE 802.11 MAC and PHY Specification, 2003 and is illustrated herein. FIG. 1 shows a set of realistic operating curves of IEEE 802.11g. As shown in FIG. 1, based on the received power level, a system will automatically adjust PHY transmission rate accordingly, and thus the throughput via MAC. It is a common working method in state-of-the-art wireless communication systems.

Several observations can be concluded based on such a realistic operation. First, the system selects the highest possible data rate transmission at each received power level. Second, when the received power is strong enough, high spectral-efficient modulations are selected to yield high throughput. For example, at −60 dBm (pretty good received power level for IEEE 802.11g/a), 64-QAM and rate 3/4 convolutional coding is selected to reach 54 Mbps PHY transmission. On the contrary, at −88 dBm (pretty weak signal strength for IEEE 802.11g/a OFDM PHY), QPSK and rate 1/2 convolutional coding are selected to result in 6 Mbps PHY transmission. Third, high spectral efficiency modulations are generally more sensitive to interference and noise. In IEEE 802.11a/g, 64-QAM is very sensitive to the phase noise and interference. In other words, for system operating at higher rates, it is more vulnerable to interference from primary/secondary systems or co-existing systems.

Considering the propagation distance between a transmitter and a receiver to have one-to-one corresponding received power, a new model for such a rate-distance feature of wireless communications can be created. Although short-term fading might not agree with this mathematical model, long-term fading such as log-normal fading may well follow this rate-distance model. The distance herein is considered as a measure of received signal power, rather than Euclidean distance or propagation distance, to characterize propagation factors for networking operation. Consequently, the distance means any possible location point with received signal power as propagation Euclidean distance under certain long-term fading.

Figure 2:
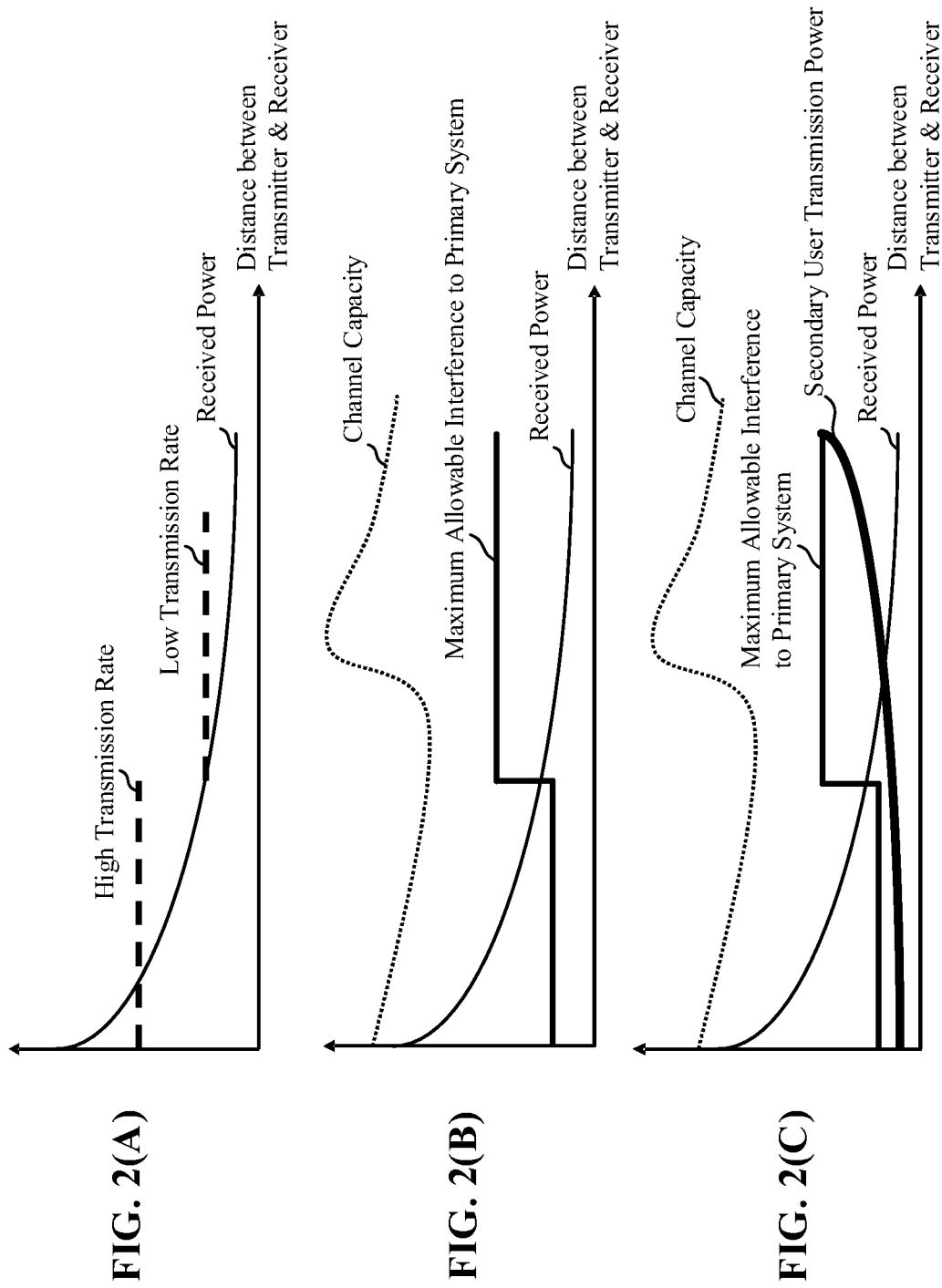
FIG. 2(A) shows the rate-distance feature of a system with two transmission rates as an example.
FIG. 2(B) shows the maximum allowable interference caused by the secondary users to primary users' system at the origin.
FIG. 2(C) shows a secondary user transmission rate/power.

FIG. 2(A) illustrates the rate-distance feature of a system with two transmission rates as an example. FIG. 2(B) shows the maximum allowable interference caused by the secondary users to primary users' system at the origin. It may be generally considered that lower rate transmission is more vulnerable to such interference. Further, as shown in FIG. 2(C), a secondary user transmission rate/power can be scheduled without affecting primary users. Therefore, if a cognitive radio senses a possible opportunity to transmit data, its transmission rate (and thus power) is determined by the following factors: channel capacity in fading channel in terms of rate-power allocation, interference level induced by co-existing operating systems, maximal tolerable interference to "active" primary system user(s), and effective "distance" relationship among primary and secondary user devices.

Figure 3:
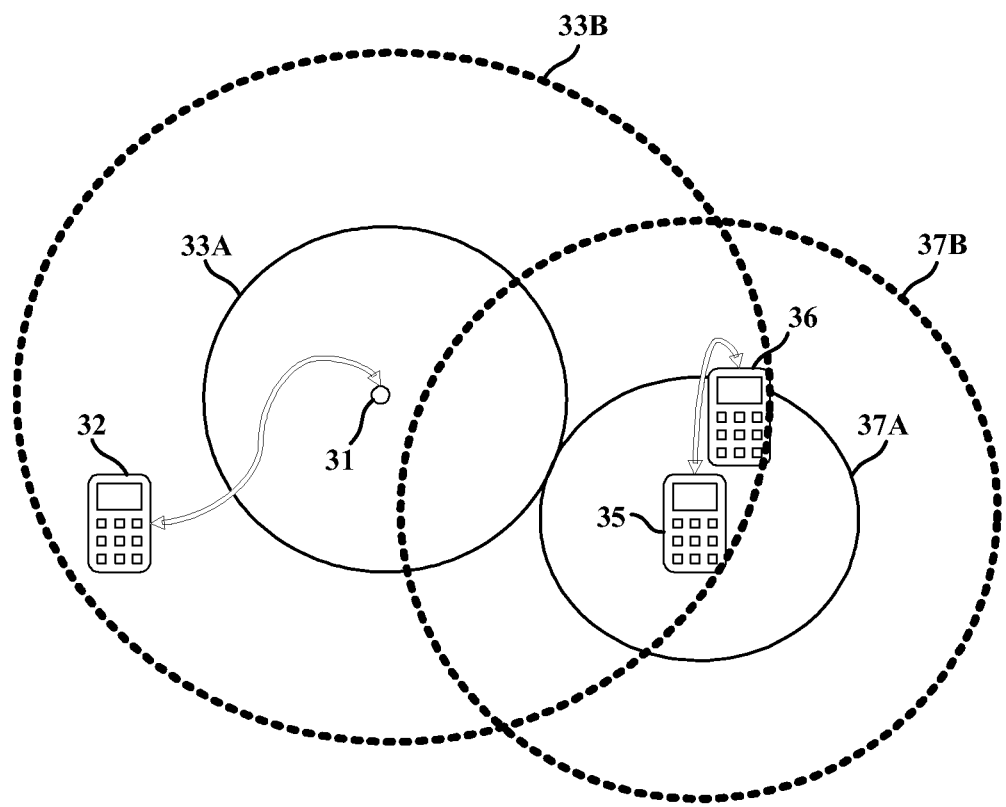
FIG. 3 shows the rate-distance feature of co-existing primary/secondary communications.

FIG. 2(A) through FIG. 2(C) depict the worst case scenario of cognitive radio communication, and more rate-distance feature can be leveraged as shown in FIG. 3. It is assumed that the base station 31 and mobile station 32 in the primary system are communicating. The circles labeled as 33A and 33B represent high-rate and low-rate regions for the primary communication, respectively. Due to their effective distance, a low transmission rate is selected. Near the boundary of the cell provided by base station 31, there are two cognitive radio devices (35 and 36) wishing to establish communication under the low-level interference for the primary system. The circles labeled as 37A and 37B represent high-rate and low-rate regions for the secondary communication, respectively. As shown in FIG. 3, high-rate communication might be possible between cognitive radios 35 and 36 without affecting the primary system, and the interference from the active primary system nodes to cognitive radios can be tolerated.

In actual applications, multi-user detection (MUD) can be applied here to relieve co-channel interference for at least cognitive radios, as the cognitive radios know the communication status of the primary users. From initial synchronization to user identification, everything can be jointly determined. This idea is not limited to CDMA communication. It has been shown that OFDM communications can utilize MUD to cancel co-channel interference, even without precise knowing of primary users in this scenario.

Device Architecture and Cognitive Radio Design

Figure 4:
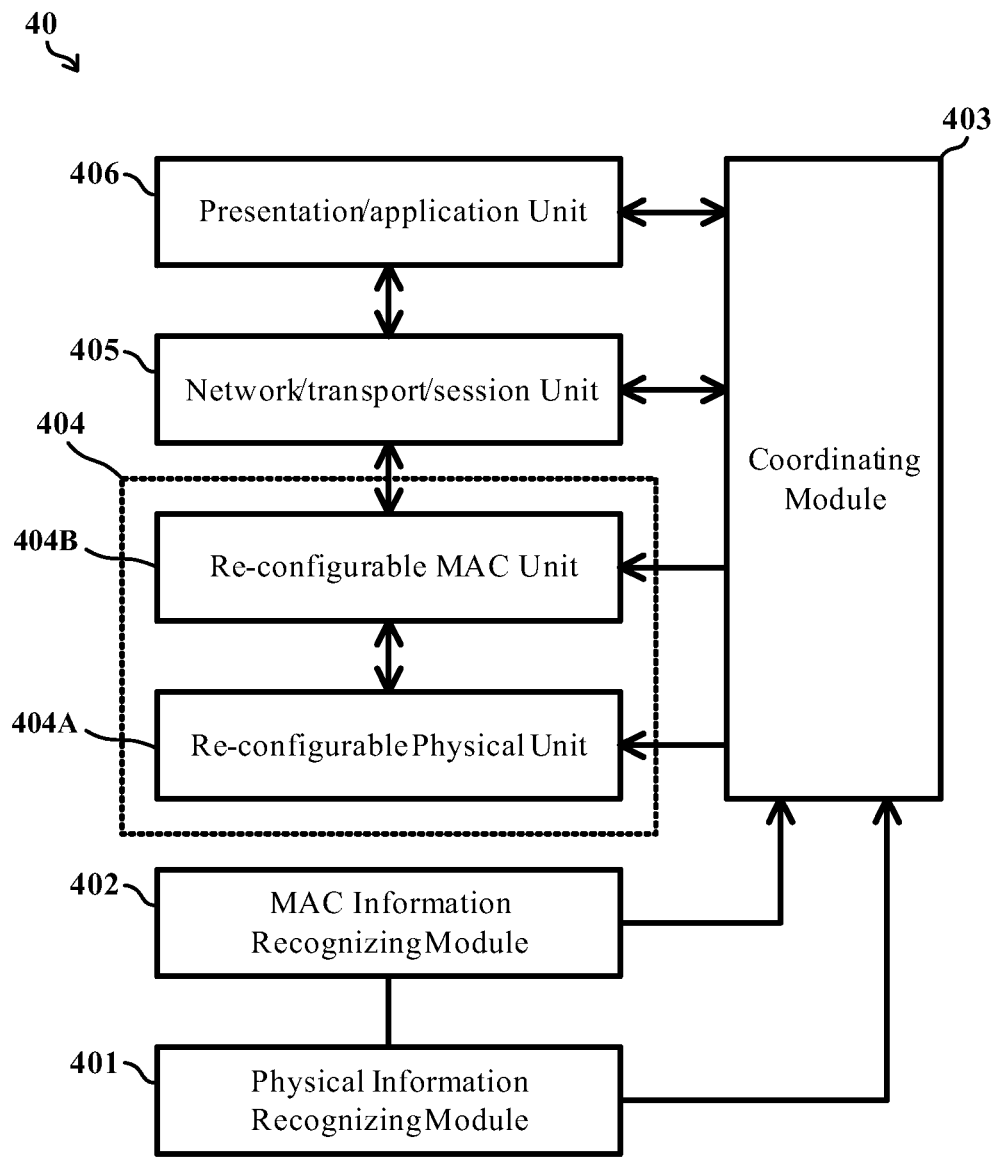
FIG. 4 illustrates the basic architecture of a communication device in one embodiment according to the invention.

One embodiment according to the invention is a communication device; FIG. 4 illustrates its basic architecture. As shown in FIG. 4, the communication device 40 includes a physical information recognizing module 401, an MAC information recognizing module 402, a coordinating module 403, a re-configurable transmitting/receiving module 404, a network/transport/session unit 405, and a presentation/application unit 406.

The re-configurable transmitting/receiving module 404 is used for transmitting and receiving data via at least one wireless communication network. Further, the re-configurable transmitting/receiving module 404 includes a re-configurable physical unit 404A and a re-configurable MAC unit 404B in this embodiment.

According to the open systems interconnection (OSI) model, functions of a typical communication network can be classified into seven layers: physical, data link, network, transport, session, presentation, and application. The physical layer is responsible for transmitting raw bits between physical network nodes. The transmitting frequency, signal voltage, modulation scheme, and similar low-level parameters are specified in this layer. In this embodiment, the re-configurable physical unit 404A is used for providing services relative to the physical layer.

On the other hand, the data link layer responds to service requests from the network layer and issues service requests to the physical layer. More specifically, the data link layer provides functional and procedural means to transfer data between network entities and might provide means to detect/correct errors that may occur in the physical layer. The format of data frames is specified in this layer. The re-configurable MAC unit 404B shown in FIG. 4 is used for providing services relative to the data link layer.

Moreover, the network/transport/session unit 405 accounts for the services relative to the network, transport, and session layers in the communication device 40. The presentation/application unit 406 provides the services relative to the presentation and application layers in the communication device 40.

The coordinating module 403 respectively receives information provided by the physical information recognizing module 401 and the MAC information recognizing module 402. Subsequently, a set of control signals is generated selectively based on the received information. In this embodiment, based on the set of control signals, one or more software/firmware/hardware providing services of the physical and data link layers is configured.

The physical information recognizing module 401 is used for recognizing a set of physical information relative to wired and/or wireless communication network(s) adjacent to the communication device 40. Similarly, the MAC information recognizing module 402 is used for recognizing a set of MAC information relative to the communication networks.

In actual applications, the physical information recognizing module 401 can include an RF unit for receiving RF signals from the communication network(s) and deriving the set of physical information from the RF signals.

Figure 5:
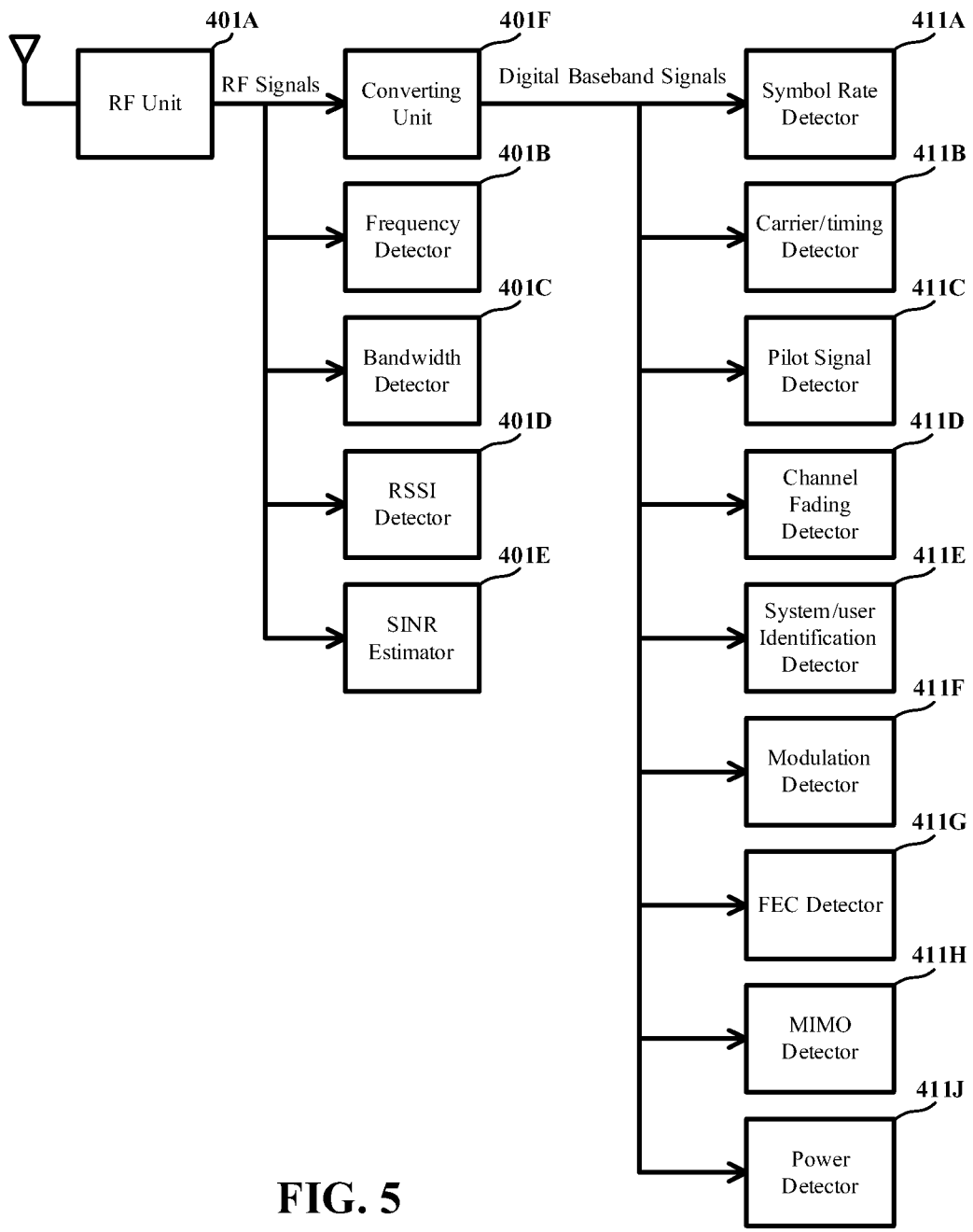
FIG. 5 shows an exemplary embodiment of the physical information recognizing module according to the invention.

FIG. 5 shows an exemplary embodiment of the physical information recognizing module 401. In this example, the RF signals received by the RF unit 401A can then be respectively transmitted to a frequency detector 401B, a bandwidth detector 401C, a received signal strength indication (RSSI) detector 401D, and a signal-to-interference and noise ratio (SINR) estimator 401E.

As implied by the name, the frequency detector 401B is used for detecting the carrier frequencies of the RF signals, and the bandwidth detector 401C is used for detecting a spectrum utility rate of the at least one communication network based on the RF signals. The RSSI detector 401D detects an RSSI of the RF signals, and the SINR estimator 401E estimates an SINR of the RF signals.

Moreover, the RF signals received by the RF unit 401A can also be transmitted to a converting unit 401F for converting the RF signals into digital baseband signals. As shown in FIG. 5, the physical information recognizing module 401 can further include a symbol rate detector 411A, a carrier/timing detector 411B, a pilot signal detector 411C, a channel fading detector 411D, a system/user identification detector 411E, a modulation detector 411F, a forward error correction (FEC) detector 411G, a multiple-input multiple-output (MIMO) detector 411H, and a power detector 411J.

The symbol rate detector 411A detects the symbol rates of the digital baseband signals. The carrier/timing detector 411B detects the carrier/timing characteristic of the digital baseband signals. The pilot signal detector 411C detects the pilot signal in the digital baseband signals. The channel fading detector 411D detects the channel fading characteristic relative to the digital baseband signals. The system/user identification detector 411E detects the system/user identification of the at least one communication network based on the digital baseband signals.

The modulation detector 411F detects the modulation parameter of the digital baseband signals. The FEC detector 411G detects the FEC type/rate of the digital baseband signals. The MIMO detector 411H detects the MIMO parameter associated with the digital baseband signals. The power detector 411J detects the power control characteristic associated with the digital baseband signals.

According to the invention, the physical information recognizing module 401 can also include only one or a few of the detectors shown in FIG. 5. All the results detected by the detectors shown in FIG. 5 can be selectively included in the set of physical information generated by the physical information recognizing module 401. It can be obviously seen that a variety of important factors, in addition to spectrum utility, are considered in the coordinating module 403.

Further, the information generated by the detectors in FIG. 5 is relative to the operation or configuration of the re-configurable physical unit 404A. Therefore, the components in the re-configurable physical unit 404A, such as front-end circuits, can be configured according to the set of physical information. For instance, a part of the re-configurable physical unit 404A can be implemented with the software-defined radio (SDR). Based on the decision of the coordinating module 403, the SDR is configured to have appropriate transceiver parameters.

In actual applications, the RF unit 401A can include several sub-band antennas and RF devices to cover the possible frequency ranges. The re-configurable physical unit 404A usually includes a similar RF unit for transmitting/receiving data. Hence, in practical applications, the physical information recognizing module 401 and the re-configurable physical unit 404A can share the RF unit.

Figure 6:
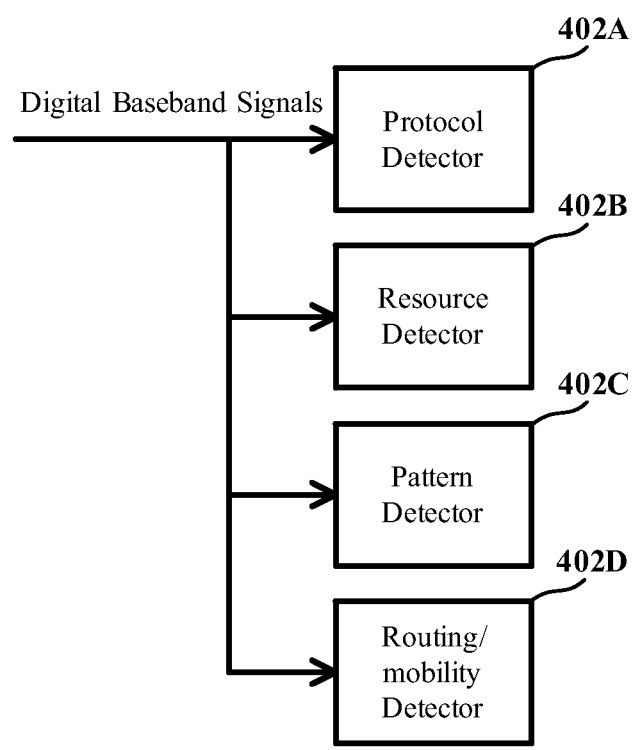
FIG. 6 illustrates an exemplary embodiment of the MAC information recognizing module according to the invention.

As shown in FIG. 4, besides the information gathered by the physical information recognizing module 401, the coordinating module 403 also receives information provided by the MAC information recognizing module 402. FIG. 6 illustrates an exemplary embodiment of the MAC information recognizing module 402. In this example, the MAC information recognizing module 402 is coupled to the converting unit 401F and includes a protocol detector 402A, a resource detector 402B, a pattern detector 402C, and a routing/mobility detector 402D.

The four detectors respectively receive the digital baseband signals generated by the converting unit 401F in FIG. 5. Based on the digital baseband signals, the protocol detector 402A can detect the multiple access protocol associated with the RF signals. The resource detector 402B detects the radio resource allocation (e.g. time slot, sub-carrier, or code) of the at least one communication network based on the digital baseband signals. Also as implied by the name, the pattern detector 402C is used for detecting the automatic repeat request (ARQ) pattern and/or the traffic pattern (e.g. ABR, CBR, or VBR) of the digital baseband signals; the routing/mobility detector 402D is used for deriving, from the digital baseband signals, the routing/mobility characteristic associated with the at least one communication network.

According to the invention, the MAC information recognizing module 402 can also include only one or a few of the detectors shown in FIG. 6. All the results detected by the detectors shown in FIG. 6 can be selectively included in the set of MAC information generated by the MAC information recognizing module 402. Based on the detected information, the coordinating module 403 can correspondingly generate appropriate control signals for configuring the MAC functions in the re-configurable MAC unit 404B. For instance, the coordinating module 403 can determine the best possible routing among available systems/networks, and the re-configurable MAC unit 404B can then be adjusted to perform proper subroutines in a universal access protocol machine.

A unified MAC algorithm for executing most well-known access protocols is presented in "A Unified Algorithm for Wireless MAC Protocols" reported by C. M. Teng and K. C. Chen on Proc. IEEE VTC, 2002. This approach can be utilized herein to implement the re-configurable MAC unit 404B. The table in FIG. 8 summarizes some common cases and corresponding operating parameters of the MAC algorithm.

In actual applications, the coordinating module 403 can generate the control signals further based on data to be transmitted by the re-configurable transmitting/receiving module 404. Moreover, the geographical locations of the communication device 40 and the other transceivers in adjacent communication networks may be considered by the coordinating module 403 as well.

Figure 7:
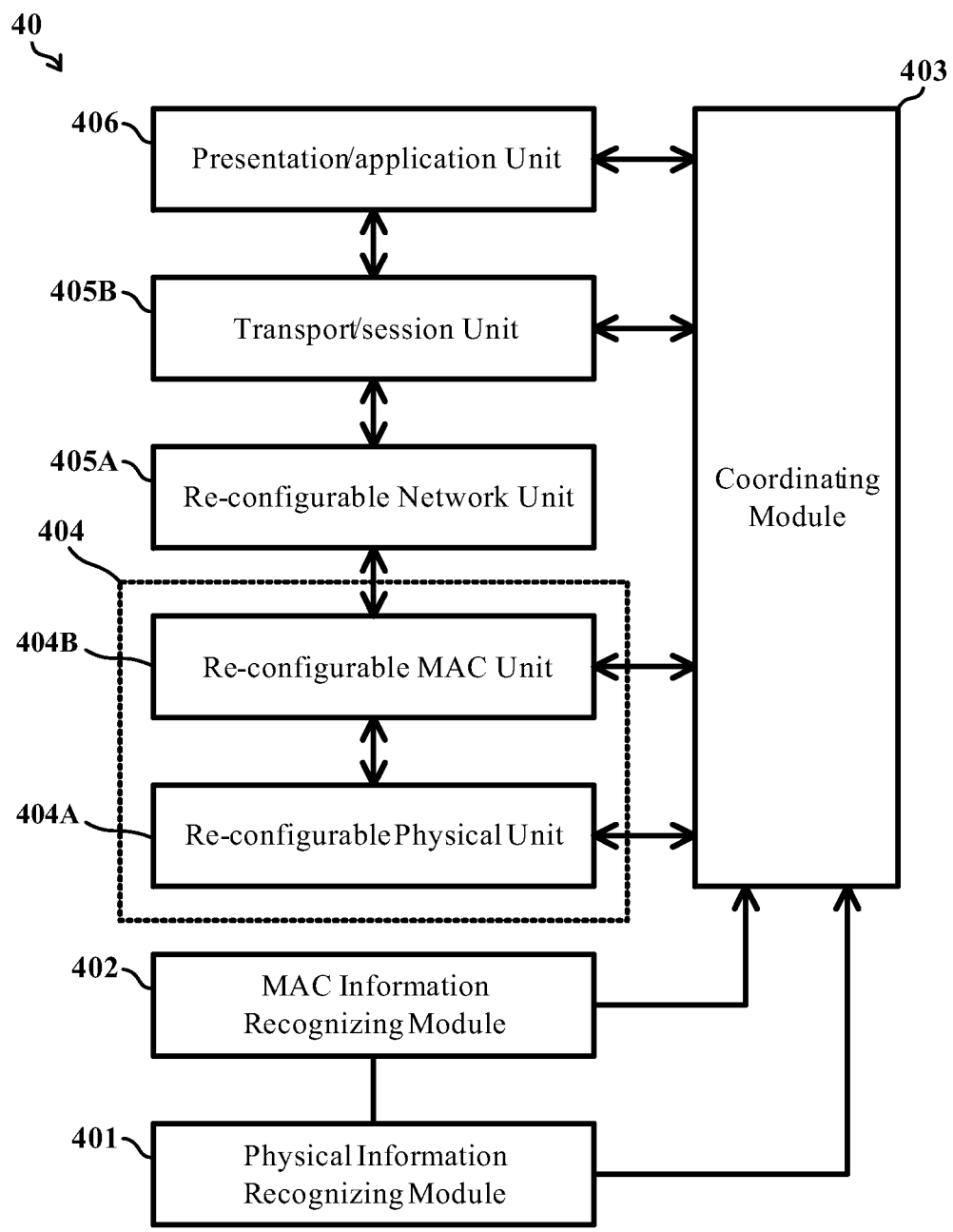
FIG. 7 illustrates the basic architecture of a communication device in another embodiment according to the invention.

Please refer to FIG. 7, which illustrates another embodiment according to the invention. In this embodiment, the network/transport/session unit 405 of FIG. 4 is divided into two parts: a re-configurable network unit 405A and a transport/session unit 405B. The re-configurable network unit 405A is used for managing network layer functions for the communication device 40 and is capable of being configured by the coordinating module 403, too. For instance, the coordinating module 403 can configure the re-configurable network unit 405A to meet the requirements about mobility management, such as inter-system handoff, systems/network cooperation, switching among systems, or self-organizing routing.

On the other hand, the transport/session unit 405B accounts for the services relative to the transport and session layers in the communication device 40. Similarly, in other embodiments according to the invention, the services of the transport, session, presentation, and application layers in the communication device 40 can also be made in a re-configurable type and overall planed by the coordinating module 403.

In summary, the coordinating module 403 can be regarded as the brain of the communication device 40. The coordinating module 403 not only determines decent access network routes based on the recognized information but also configures the proper hardware and software of the communication device 40. Moreover, the coordinating module 403 can also maintain user's communication need to the utmost.

Inter-Systems/Networks Cooperative Communications

In prior arts, most typical approaches of self-organized wireless communications are directed toward topology controls of the entire possible networks/systems. The unlicensed mobile access (UMA) even considers the update of infrastructures, which is unpractical.

As described above, the communication device 40 according to the invention can determine its routing based solely on available information of radio access networks. The radio access network herein can be a part of the digital cellular like UMTS terrestrial radio access network (UTRAN), an access point of Wireless LANs connected to Internet, a base station in WiMAX, or a subscriber station in a mesh network. The coordinating module 403 can be used for scheduling the networking functions in routing so as to control the quality of service (QoS), and for deciding the appropriate configuration of MAC, RF parameters, and parameters of software radio communication.

Traditionally, one mobile device capable of operating in one system cannot operate in another system, and resources of plural systems co-existing in the same area may not be evenly distributed; some of the systems may be crowded in traffic while the others may have little or no traffic. For inter-systems/networks cooperative communications, it can be assumed that a plurality of communication systems are operating within a certain geographical area and communication devices can access all operating frequency bands. Through cognitive radio according to the invention, possible cooperation among these systems is leveraged to improve the individual and overall performance. The primary challenge is to determine the right cooperation among various combinations of systems to enhance performance or QoS.

To explain the inter-systems/networks cooperative communications according to the invention, a circuit switching (CS) network (such as 2G/3G cellular) with $n_1$ users and a packet switching (PS) network (such as WiFi) with $n_2$ users are taken as an example. It can be demonstrated that effective routing and enhanced overall network performance can be practicable under the condition that these N ($=n_1+n_2$) users operate in the cognitive mode.

The channel is assumed lossless, and therefore collision is the only reason that a given packet needs to be retransmitted. Handoff is temporarily ignored and thus the number of users in the network is also assumed to be relatively steady.

The first access network (i.e. the CS network) is modeled as a multi-server queue with $N_1$ servers. The service rates of $N_1$ servers are all deterministic and equal to $\mu_1$. A certain user is served by one server only and no more than $N_1$ users can be admitted into this network. The second access network (i.e. the PS network) is modeled as a single-server queued with a multiple access device in front of the server to decide which user has the right to access media. The service rate of this server is deterministic with rate $\mu_2$, and the multiple access scheme is assumed to be slotted ALOHA with retransmission probability q.

Two types of traffic are considered in services: CBR and ABR (respectively representing voice and data), while arrival rates of the same service type are assumed to be equal. It is assumed that for CBR, the deterministic arrival rate is $\lambda c$, the delay bound is $\delta c$, and the number of users in the PS network is Nc. Further, it is assumed that for ABR, the poisson arrival rate with a mean equal to $\lambda a$, and the number of users in the PS network Na.

The average delay is measured in the wireless end, and the overall performance (E[D]) is evaluated by calculating the average delay ($D_i$, i=1~N) of all users:

$$E[D] = \frac{1}{N}\sum_{i=1}^{N} D_i.$$

The overall performance with and without inter-systems/networks cooperation will be compared later. On the other hand, the individual performance of the two access networks ($E[D_1]$ and $E[D_2]$) can be evaluated by calculating the average delay for users in the specific network:

$$E[D_k] = \frac{1}{n_k}\sum_{i=1}^{n_k} D_{i,k} (k = 1, 2).$$

Because the users may take the cost as a measure of performance in practical applications, a cost model can be further embedded into the following analysis. Assuming a user needs to pay $P_k$ dollars to access system k (k=1, 2), the average price of all users can be calculated:

$$E[P] = \frac{1}{N}\sum_{i=1}^{N} P_i.$$

The cognitive radio can route its traffic toward two targets: a small enough delay to satisfy the delay bound for CBR service and lower average price. The mathematical equations for the average delay of a single user are derived below:

(i) CBR via AN1

For services with arrival rate $\lambda_c < \mu_1$, this is a D/D/1 queue, and the delay would be a constant: $D_{c,1} = 1/\mu_1$.

(ii) ABR via AN1

For services with arrival rate $\lambda_a < \mu_1$, this is modeled as a M/D/1 queue and the average delay would be:

$$E[D_{A,1}] = \frac{1}{\mu_1} + \frac{\lambda_a/\mu_1}{2(\mu_1 - \lambda_a)}.$$

(iii) CBR via AN2

Assuming in AN2 there are ($N_c$-1) other CBR users with the same arrival rate and there is no ABR user, the average delay can be:

$$E[D_{C,2}] = \frac{1}{\mu_2}\left[\frac{1}{2} + \frac{1 - p_{s,c} + q}{p_{s,c} q}\right].$$

where q is the retransmission probability and $p_s$ is the probability of successful transmission. For $N_c=1$, $p_{s,c}=1$, while for $N_c>1$, $p_{s,c}=(1-\lambda_c/\mu_2)^{(N_c-1)}$.

(iv) ABR via AN2

Assuming in AN2 there are ($N_a$-1) other ABR users with the same arrival rate and there is no CBR user, the average delay can be:

$$E[D_{A,2}] = \frac{1}{\mu_2}\left[\frac{1}{2} + \frac{1 - p_{s,a} + q}{p_{s,a} q}\right].$$

wherein q is the retransmission probability and $p_s$ is the probability of successful transmission. For $N_a=1$, $p_{s,a}=1$, while for $N_a>1$, $p_{s,a}=\exp(-\lambda_a(N_a-1))$.

The scenario is evaluated with the following relationship between different rates:

$$\lambda_a = \lambda_c = 0.1\mu_1 = 0.02\mu_2.$$

Assuming $P_1 > P_2$, the average delay for CBR and ABR service is shown in FIG. 9 and the unit slot time for delay is equal to $(1/\mu_2)$.

If the delay bound $\delta_c$ is set to be 8 time slots, then AN2 can take up to 15 CBR services while not maintaining appropriate quality. Say $n_1 = n_2 = 8$, $N_1 = 10$, then $n_1' = 1$, $n_2' = 15$, $$E[D_1] = \begin{cases} 4.16 & \text{without cooperation} \\ 7.34 & \text{with cooperation} \end{cases},$$

$$E[D_2] = \begin{cases} 3.31 & \text{without cooperation} \\ 7.49 & \text{with cooperation} \end{cases},$$

and $$E[P] = \frac{1}{2}P_1 + \frac{1}{2}P_2 > \frac{1}{16}P_1 + \frac{15}{16}P_2 = E[P'].$$

In this case, some of the old CBR users in AN1 would switch to AN2 because of lower price and acceptable delay. For ABR users, since there is no delay limit, users in AN1 would switch to AN2 until the PS network can no longer support to the point that its throughput starts to decrease. In the above numerical example, the effectiveness of cooperative self-organized (by mobile device only) cognitive radio networking is successfully verified in consequence.

As described above, according to this invention, the concept of cognitive radio is generalized toward communication and networking environment sensing to leverage co-existing systems/networks. In addition to spectrum efficiency, the overall networking efficiency for mobile devices in front of co-existing networks can be enhanced.

A practical architecture design of a self-organized cognitive radio based on the rate-distance nature is also demonstrated. The communication device according to the invention has a precise/novel cognitive radio structure, a corresponding cognitive cycle, a re-configurable MAC design, and a coordinator for determining appropriate routing traffic to enhance overall utilization and efficiency of wireless networks.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A communication device, comprising:
   a physical information recognizing module for recognizing a set of physical information relative to at least one communication network, comprising:
      an RF unit for receiving RF signals from the at least one communication network; and
      a converting unit, coupled to the RF unit, for converting the RF signals into digital baseband signals;
   an MAC information recognizing module for recognizing a set of MAC information relative to the at least one communication network, comprising:
      a protocol detector for detecting, based on the digital baseband signals, a multiple access protocol associated with the RF signals;
      a resource detector for detecting a radio resource allocation of the at least one communication network based on the digital baseband signals;
      a pattern detector for detecting an automatic repeat request (ARQ) pattern and/or a traffic pattern of the digital baseband signals; and
      a routing/mobility detector for deriving a routing/mobility characteristic associated with the at least one communication network from the digital baseband signals;
   a coordinating module, coupled to the physical information recognizing module and the MAC information recognizing module, for generating a set of control signals selectively based on the set of physical information and the set of MAC information; and
   a re-configurable transmitting/receiving module, coupled to the coordinating module and configured according to the set of control signals, for transmitting/receiving data via the at least one communication network.

2. The communication device of claim 1, wherein the set of physical information is derived from the RF signals.

3. The communication device of claim 1, wherein the MAC information recognizing module is also coupled to the converting unit; the MAC information recognizing module receives the digital baseband signals and derives the set of MAC information from the digital baseband signals.

4. The communication device of claim 3, wherein the set of MAC information comprises the multiple access protocol.

5. The communication device of claim 3, wherein the set of MAC information comprises the radio resource allocation.

6. The communication device of claim 3, wherein the set of MAC information comprises the ARQ pattern and/or the traffic pattern.

7. The communication device of claim 3, wherein the set of MAC information comprises the routing/mobility characteristic.

8. The communication device of claim 1, wherein the coordinating module generates the set of control signals further based on data to be transmitted by the re-configurable transmitting/receiving module.

9. The communication device of claim 1, wherein the coordinating module generates the set of control signals further based on a first location of the communication device and/or a second location of a transceiver in the at least one communication network.

10. The communication device of claim 1, wherein the re-configurable transmitting/receiving module comprises:
    a re-configurable physical unit, configured according to the set of control signals, for transmitting/receiving physical signals for the communication device; and
    a re-configurable MAC unit, configured according to the set of control signals, for managing MAC functions for the communication device.

11. The communication device of claim 1, wherein the re-configurable transmitting/receiving module comprises:
    a re-configurable network unit, configured according to the set of control signals, for managing network functions for the communication device;
    wherein the set of control signals is relative to at least one selected from the group consisting of a decision about inter-system handoff, a decision of cooperative systems/networks, a decision about switching among systems, and a decision of self-organizing routing.

12. The communication device of claim 1, wherein the set of control signals is relative to settings at a transport-layer unit, a session-layer unit, a presentation-layer unit, or an application-layer unit of the communication device.

13. The communication device of claim 1, wherein the at least one communication network comprises a wired network and/or a wireless network.

14. A method for managing a communication device, comprising the steps of:
    recognizing a set of physical information relative to at least one communication network;
    converting an RF signal in the at least one communication network into digital baseband signals;
    recognizing a set of MAC information relative to the at least one communication network;
    generating a set of control signals selectively based on the set of physical information and the set of MAC information; and
    based on the set of control signals, configuring a re-configurable transmitting/receiving module in the communication device, the re-configurable transmitting/receiving module being used for transmitting/receiving data via the at least one communication network;
    wherein the step of recognizing the set of MAC information comprises:
       detecting, based on the digital baseband signals, a multiple access protocol associated with the RF signals;
       detecting a radio resource allocation of the at least one communication network based on the digital baseband signals;
       detecting an automatic repeat request (ARQ) pattern and/or a traffic pattern of the digital baseband signals; and deriving a routing/mobility characteristic associated with the at least one communication network from the digital baseband signals.

15. The method of claim 14, wherein the at least one communication network comprises a wired network and/or a wireless network.

16. The method of claim 14, wherein the set of control signals is relative to settings at a transport-layer unit, a session-layer unit, a presentation-layer unit, or an application-layer unit of the communication device.

* * * * *